United States Patent
Nozaki

Patent Number: 5,601,068
Date of Patent: Feb. 11, 1997

[54] METHOD AND APPARATUS FOR CONTROLLING A DIESEL ENGINE

[75] Inventor: Ryoichi Nozaki, Tokyo, Japan

[73] Assignee: Nozel Engineering Co., Ltd., Tokyo, Japan

[21] Appl. No.: 614,265

[22] Filed: Mar. 12, 1996

Related U.S. Application Data

[63] Continuation of Ser. No. 498,336, Jul. 5, 1995, abandoned.

[51] Int. Cl.$^6$ ............................. F02D 41/14; F02M 25/07
[52] U.S. Cl. ............................. 123/676; 123/569; 123/571
[58] Field of Search ..................... 123/378, 676, 123/568, 569, 571; 364/431.06

[56] References Cited

U.S. PATENT DOCUMENTS

| | | | |
|---|---|---|---|
| 4,305,364 | 12/1981 | Stuckas | 123/676 |
| 4,400,944 | 8/1983 | Iwamoto et al. | 123/676 |
| 4,408,585 | 10/1983 | Stuchas | 123/676 |
| 4,433,666 | 2/1984 | Masaki et al. | 123/569 |
| 4,462,376 | 7/1984 | Ripper et al. | 123/569 |
| 4,793,318 | 12/1988 | Tsurusaki | 123/676 |
| 4,834,054 | 5/1989 | Hashimoto et al. | 123/676 |
| 4,870,942 | 10/1989 | Shibata et al. | 123/676 |
| 4,967,717 | 11/1990 | Miyazaki et al. | 123/571 |
| 5,243,949 | 9/1993 | Osawa | 123/676 |
| 5,377,651 | 1/1995 | Sczomak et al. | 123/569 |

FOREIGN PATENT DOCUMENTS 2528115  12/1983  France .

OTHER PUBLICATIONS

687 MTZ Motortechnische Zeitschrift 54 (1993) Oktober, No. 10, Stuttgart, Die neuen Vierventil–Dieselmotoren von Mercedes–benz (pp. 490–500), Oct. 1993.

*Primary Examiner*—Willis R. Wolfe
*Attorney, Agent, or Firm*—Armstrong, Westerman, Hattori, McLeland & Naughton

[57] ABSTRACT

A method and apparatus for controlling a diesel engine to decrease the detrimental compositions of exhaust gas by supplying an appropriate amount of oxygen into the combustion chamber for the burning of the fuel. This is accomplished by a controlling apparatus comprising an exhaust gas recirculating pipe, for recirculating exhaust to an intake pipe, having a recirculated gas temperature sensor and a recirculated exhaust gas throttle valve; an outside air temperature sensor in the intake pipe; a fuel sensor; an engine state sensor; an air calculating section for calculating a required amount of air on the basis of the amount of fuel detected by the fuel sensor and the outside air temperature detected by the outside air temperature sensor; a recirculated gas calculating section for receiving information from the air calculating section and calculating the required amount of recirculated gas on the basis of the output signal from the recirculated gas temperature sensor and the engine state sensor; and a recirculating gas control section for operating the recirculated gas throttle valve in response to the calculated amount of recirculated gas.

11 Claims, 12 Drawing Sheets

EXHAUST PIPE (BACKPRESSURE)

METHOD AND APPARATUS FOR CONTROLLING A DIESEL ENGINE

This application is a continuation of application Ser. No. 08/498,336 filed Jul. 5, 1995, now abandoned.

TECHNICAL FIELD

This invention relates to the method and apparatus for controlling a diesel engine that supplies appropriate amount of oxygen for best combustion so as to decrease the detrimental compositions of exhaust gas.

BACKGROUND OF THE INVENTION

In recent years, air pollution caused by exhaust gas from a diesel engine becomes a social problem. It is the air pollution cause that the amount of nitrogen oxide (NOx) exhausted from the diesel engine per a unit horsepower is larger than that from a gasoline engine, and a large-sized car generally mounts the diesel engine. In the prior diesel engine, power is controlled by only controlling an amount of fuel injection without controlling an amount of oxygen used for fuel burning. In general, the air is introduced in a combustion chamber as large as possible and is caused to react with fuel.

In such a prior art, however, there is a problem which the air excessively introduced in the combustion chamber generates nitrogen oxide when the air is exposed to higher temperature circumstances in an expansion stroke.

Exhaust gas temperature before a muffler, in the usual automobile case, changes widely from 70°~700° C. or 340~970 K. It means that exhaust gas density changes 2.85 times.

For controlling Exhaust Gas Recirculation (EGR) at high temperature precisely, components for EGR control must be protected from higher temperature circumstances. Since exhaust gas temperature changes greatly in a short time, a temperature sensor as an integral component of EGR control is required to response rapidly to wide temperature range. Same problem rises in a method for EGR control.

Exhaust gas density also affects the EGR control. The engine takes in air by the given volume and so the mass recirculation rate for combustion is greatly decreased when recirculation rate is controlled by volume recirculation rate. When recirculation rate is controlled by the mass recirculation rate alternatively, intake of outside air for combustion is greatly decreased. Therefore both are not practical. Said influence can be avoided by controlling exhaust gas temperature to be below 120° C. (390 K) approximately at the junction of recirculating gas flow and incorporated outside air flow.

The throttle valve accuracy degrades when particles in the recirculating gas adhere to the valve, and the accuracy of a pressure sensor of a flowmeter degrades when particles jam the port of the pressure sensor.

It is an object of the invention to provide the method and apparatus for controlling a diesel engine that supplies appropriate amount of oxygen for fuel burning so as to inhibit generation of nitrogen oxide.

DISCLOSURE OF THE INVENTION

The present invention is intended to achieve above-mentioned object.

According to the present invention, there is provided, in a controlling apparatus (10) of a diesel engine (E) for decreasing the detrimental compositions of exhaust gas by supplying an appropriate amount of oxygen for fuel burning, the controlling apparatus comprising: a recirculating pipe (30), having a recirculated gas temperature sensor (31) and a recirculated gas throttle valve (32), for recirculating exhaust gas between exhaust system and intake system; an intake pipe (20) having an outside air temperature sensor (21) and an outside air throttle valve (22); a fuel sensor (11); an engine state sensor (15); an air calculating section (40) for calculating a required amount of air on the basis of an amount of the fuel detected by said fuel sensor (11) and the outside air temperature detected by said outside air temperature sensor (21), an outside air introduction control section (45) for operating said outside air throttle valve (22) responding to the calculated required amount of air; a recirculated gas calculating section (50) for receiving information of the calculated required amount of air and calculating a required recirculated gas flow rate on the basis of information from said recirculated gas temperature sensor (31) and said engine state sensor (15); and a recirculating gas control section (55) for operating said recirculated gas throttle valve (32) responding to the calculated amount of recirculated gas.

Further, according to the present invention, there is provided, in a controlling apparatus (10) of a diesel engine (E) for decreasing the detrimental compositions of exhaust gas by supplying an appropriate amount of oxygen for fuel burning, controlling apparatus (10) comprising: a recirculating pipe (30), for recirculating exhaust gas between exhaust system and intake system, having a recirculated gas temperature sensor (31) and a recirculated gas throttle valve (32); an intake pipe (20) having an outside air temperature sensor (21); a fuel sensor (11); an engine state sensor (15); an air calculating section (40) for calculating a required amount of air on the basis of an amount of the fuel detected by said fuel sensor (11) and the outside air temperature detected by said outside air temperature sensor (21); a recirculated gas calculating section (50) for receiving information of the calculated required amount of air and calculating a required amount of recirculated gas on the basis of information from said recirculated gas temperature sensor (31) and said engine state sensor (15); and a recirculating gas control section (55) for operating said recirculated gas throttle valve (32) responding to the calculated amount of recirculated gas.

Further, according to the present invention, there is provided, in a method of controlling a diesel engine, having a recirculating pipe (30) for recirculating exhaust gas between exhaust system and intake system, to supply appropriate amount of oxygen for fuel burning, the method of controlling a diesel engine comprising the steps of: detecting always recirculated gas temperature in said recirculating pipe (30), outside air temperature, an engine state and a fuel flow rate; calculating a required amount of air on the basis of said fuel flow rate and calculating a required recirculated gas flow rate with receiving said required amount of air; and supplying outside air responded to said required amount of air and required amount of recirculated gas.

Further, according to the present invention, there is provided, in a method of controlling a diesel engine having a recirculating pipe (30) for recirculating exhaust gas between exhaust system and intake system so as to decrease the detrimental compositions of fuel burning, the method of controlling a diesel engine comprising the steps of: detecting always recirculated gas temperature in said recirculating pipe (30), outside air temperature, an engine state and a fuel flow rate; calculating a required amount of air on the basis of said fuel flow rate and said outside air temperature, and calculating a required recirculated gas flow rate responding to said recirculated gas temperature and engine state with receiving said required amount of air; and controlling an outside air flow rate responding to said calculated required amount of air and a recirculated gas flow rate responding to calculated amount of recirculated gas.

Further, according to the present invention, there is provided, in a method of controlling a diesel engine, having a recirculating pipe (30) for recirculating exhaust gas between exhaust system and intake system, to supply appropriate amount of oxygen for fuel burning, the method of controlling a diesel engine comprising the steps of: detecting always recirculated gas temperature in said recirculating pipe (30), outside air temperature, an engine state and a fuel flow rate; detecting an intake of outside air and calculating the fuel flow rate responded to said intake of outside air, and calculating a required recirculated gas flow rate with receiving said intake of outside air; and supplying outside air responded to said required amount of air and required amount of recirculated gas.

Further, according to the present invention, there is provided, in a controlling apparatus of a diesel engine comprising a control table (65) for storing state data of exhaust gas being in a good condition from various sensors, said control table (65) is connected to an outside air introducing control section (45) and/or a recirculating gas control section (55), and their or its output is connected to an outside air throttle valve (22) and/or recirculated gas throttle valve (32).

Further, according to the present invention, there is provided, in a method of controlling a diesel engine for supplying appropriate amount of oxygen for fuel burning, method of controlling a diesel engine comprising the steps of: storing state data of exhaust gas being in good conditions in a control table (65); and operating an outside air throttle valve (22) and recirculated gas throttle valve (32) or only recirculated gas throttle valve (32) responding the state data in a control table (65) corresponding to various conditions.

Further, according to the present invention, there is provided, in the controlling apparatus of a diesel engine as above-mentioned, further comprising a table making section (60) for learning and educating exhaust gas conditions by changing various conditions indicated by respective sensors, said control table (65) stores good conditions of exhaust gas learned or educated by the table making section (60).

Further, according to the present invention, there is provided, in the method of controlling a diesel engine as above-mentioned, further comprising the steps of: learning and educating exhaust gas conditions by changing various conditions indicated by respective sensors; and storing consequences of learning and education.

Further, according to the present invention, there is provided, in a controlling apparatus (10) of a diesel engine (E) as above-mentioned, said recirculating pipe (30) is equipped with a cooling means (36) for preventing the temperature of said recirculated gas from rising.

Further, according to the present invention, there is provided, in a controlling apparatus (10) of a diesel engine (E) as above-mentioned, said recirculating pipe (30) is equipped with a particle removing means (37) for removing various particles included in said recirculated gas.

In the invention, outside air is provided to a combustion chamber of the diesel engine (E) through the intake pipe (20), and required amount of exhaust gas is recirculated between the exhaust system and the intake system through the recirculating pipe (30). Required compression pressure is obtained by the provided outside air and recirculated exhaust gas, and so fuel burns without being heated undesired high temperature; therefore, generated nitrogen oxide is inhibited in the smallest level.

More concretely, recirculated gas temperature in the recirculating pipe (30), outside air temperature, the state of the engine indicated by engine coolant temperature, exhaust gas temperature, rev count, compression pressure, ignition temperature etc. and the fuel flow rate are being detected, and that the required amount of air for the fuel flow rate is calculated by these detected data, and then the required recirculated gas flow rate is calculated on the basis of information of the required amount of air. The required recirculated gas flow rate becomes seldom zero according to the situation.

Appropriate amount of oxygen for fuel burning is supplied by supplying outside air responded to said required amount of air and required amount of recirculated gas, and so the generation of nitrogen oxide is inhibited in the smallest level.

Recirculated gas temperature in the recirculating pipe (30) is detected by recirculated gas temperature sensor (31), and outside air temperature is detected by the outside air temperature sensor (21) mounted to the intake pipe (20). The engine state is sensed by the engine state sensor (15) that detects the engine coolant temperature, the exhaust gas temperature, an exhausting state, the rev count, compression pressure, ignition temperature etc. at need, and the fuel flow rate is detected by the fuel sensor (11).

Receiving information from respective sensors, the air calculating section (40) calculates the required amount of air on the basis of information of the amount of the fuel detected by said fuel sensor (11) and the outside air temperature detected by said outside air temperature sensor (21). Receiving information of the calculated required amount of air, the recirculated gas calculating section (50) calculates the required recirculated gas flow rate on the basis of information from said recirculated gas temperature sensor (31) and said engine state sensor (15).

Then on the basis of these calculated data, the outside air introducing control section (45) operates said outside air throttle valve (22) responding to the calculated required amount of air and sets an appropriate intake of outside air, and the recirculating gas control section (55) operates said recirculated gas throttle valve (32) responding to the calculated amount of recirculated gas and sets a appropriate amount of recirculated gas.

The appropriate amount of oxygen for fuel burning at given compression pressure is supplied by supplying appropriate intake of outside air and appropriate amount of recirculated gas, and so the generation of nitrogen oxide is inhibited in the smallest level.

Since there is corresponding relationship between the intake of outside air and the amount of recirculated gas, the detrimental compositions of exhaust gas can be decreased only to control recirculated gas without controlling of the outside air throttle valve (22) and the intake of outside air.

In this case, the air calculating section (40) calculates required amount of air on the basis of the amount of the fuel detected by said fuel sensor (11) and the outside air temperature detected by said outside air temperature sensor (21), and then the recirculated gas calculating section (50) receives information of the calculated required amount of air and calculates the required amount of recirculated gas on the basis of information from said recirculated gas temperature sensor (31) and said engine state sensor (15) with considering outside air. And the recirculating gas control section (55) operates said recirculated gas throttle valve (32) responding to the calculated amount of recirculated gas.

The setting of appropriate amount of air and recirculated gas can be done before the operation as a table. Appropriate amount of air or gas, obtained beforehand in tests corresponding to various conditions, is stored in the control table (65) that controls diesel engine (E).

Thus in the case of controlling outside air or the recirculated gas directly, the outside air introducing control section (45) and the recirculating gas control section (55) read the appropriate amount of air or recirculated gas in the control table (65) to operate the outside air throttle valve (22) for setting the appropriate intake of outside air and to operate the recirculated gas throttle valve (32) for setting appropriate amount of recirculated gas. Data for controlling only the recirculated gas throttle valve (32) may be stored in the control table (65).

The control table (65) can be formed also in the practical engine driving. The table making section (60) detects exhaust gas condition of the engine corresponding to the changes of the various conditions indicated by respective sensors for learning and educating exhaust gas condition, and the control table (65) stores good condition data of exhaust gas corresponding to the various conditions.

Appropriate amount of oxygen for fuel burning can be controlled with outside air responding to said required amount of air and required amount of recirculated gas by detecting an intake of outside air and calculating the fuel flow rate responded to said intake of outside air, and by calculating a required recirculated gas flow rate on the basis of the intake of outside air instead of calculating the required amount of air on the basis of the amount of fuel.

BEST MODES FOR CARRYING OUT THE INVENTION

Referring now to the accompanying drawings, various embodiment will be described.

Figure 1:
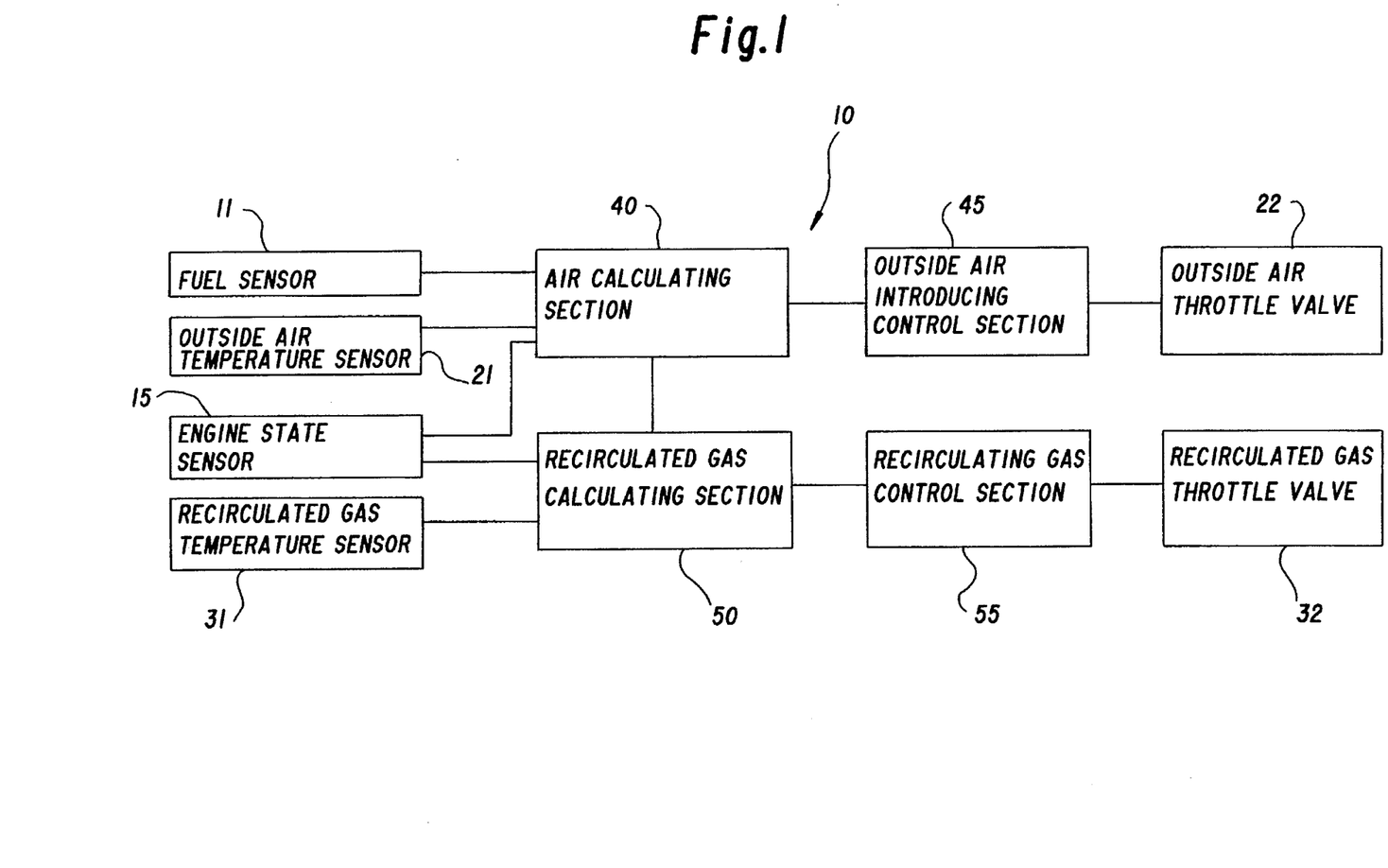
FIG. 1 is a block diagram showing first embodiment of an apparatus of controlling a diesel engine.
Figure 2:
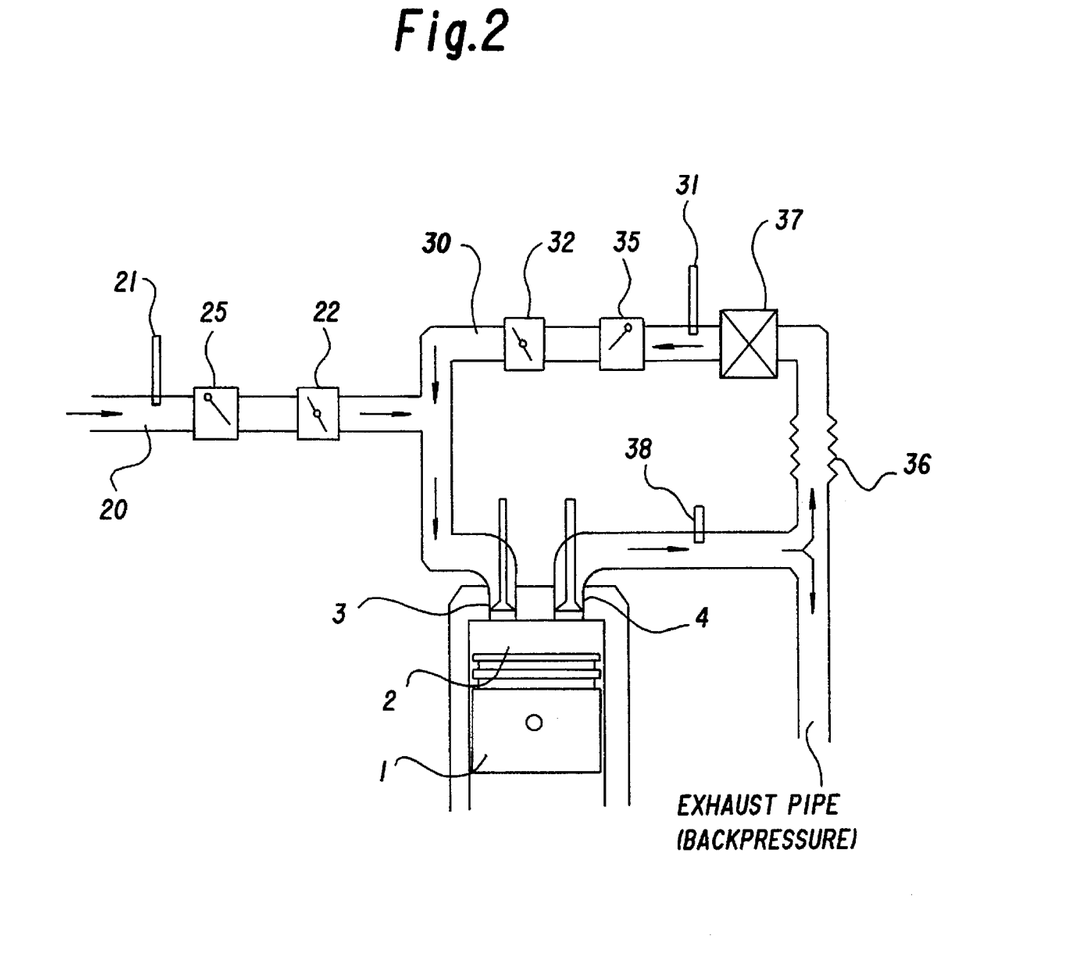
FIG. 2 is a schematic illustration showing the composition of first embodiment of an apparatus of controlling a diesel engine near the engine.
Figure 3:
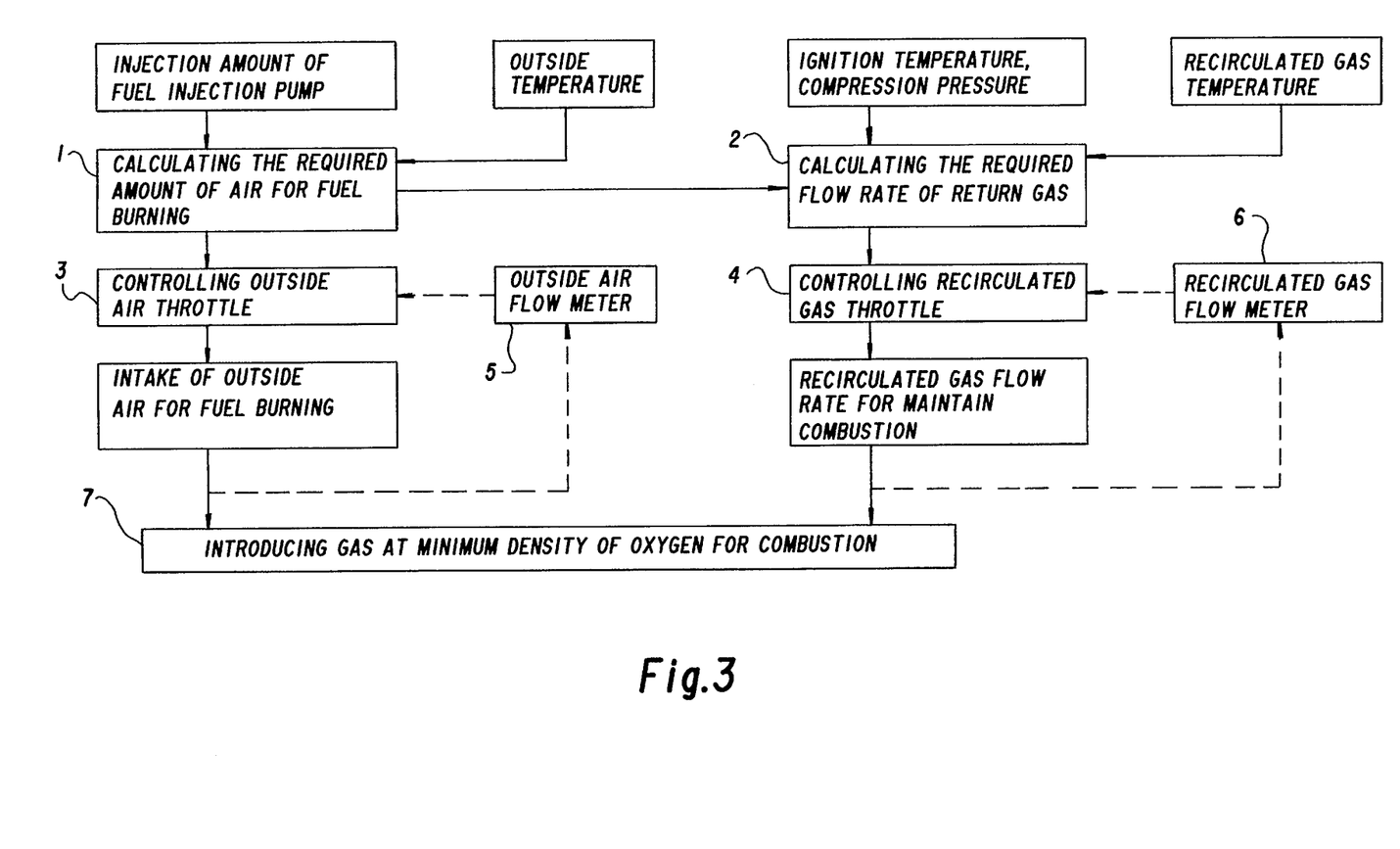
FIG. 3 is a block diagram showing operation of first embodiment of an apparatus of controlling a diesel engine.

In FIGS. 1–3, there is shown first embodiment of this invention.

An controlling apparatus 10 of a diesel engine is an apparatus for decreasing the detrimental compositions of exhaust gas by supplying an appropriate amount of oxygen for fuel burning.

As shown in FIG. 2, the diesel engine E has a piston 1 which moves up and down in a combustion chamber 2, and an induction valve 3 and an exhaust valve 4 are mounted facing to the combustion chamber 2. An intake pipe 20 is connected to the intake valve 3. An exhaust manifold connected to the exhaust valve 4 has a recirculating pipe 30 which branches off from the exhaust manifold for supplying exhaust gas to intake system. The end of the recirculating pipe 30 is connected to intermediate portion of said intake pipe 20.

An outside air temperature sensor 21 and an outside air throttle valve 22 are mounted to the intake pipe 20, and an outside air flow meter 25 is also mounted thereto. A recirculated gas temperature sensor 31 and a recirculated gas throttle valve 32 are mounted to the recirculating pipe 30, and a recirculated gas flow meter 35, a cooling means or a radiator 36 for cooling exhaust gas, a particle removing means 37 and an exhaust gas thermometer 38 are also mounted thereto.

As shown in FIG. 1, the controlling apparatus 10 of the diesel engine E is equipped with a fuel sensor 11 and an engine state sensor 15. The engine state sensor 15 is not a single sensor, but it is usually the combination of a pressure sensor, a temperature sensor, etc. It detects various conditions of the engine such as an engine coolant temperature, an exhaust gas temperature, an exhausting state, the revy count and if possible compression pressure, ignition temperature, etc.

The controlling apparatus 10 of the diesel engine E is equipped with an air calculating section 40 and a recirculated gas calculating section 50 that receive outputs from said various sensors and operate according to the output. Furthermore, it has an outside air introducing control section 45 which operates according to an instruction from the air calculating section 40 and a recirculating gas control section 55 which operates according to an instruction from the recirculated gas calculating section 50.

The air calculating section 40 calculates a required amount of air on the basis of an amount of the fuel detected by said fuel sensor 11 and the outside air temperature detected by said outside air temperature sensor 21. The recirculated gas calculating section 50 receives information of the calculated required amount of air and calculates a required recirculated gas flow rate on the basis of information from said recirculated gas temperature sensor 31 and said engine state sensor 15.

The outside air introducing control section 45 operates the outside air throttle valve 22 responding to the calculated required amount of air. The recirculating gas control section 55 operates said recirculated gas throttle valve 32 responding to the calculated amount of recirculated gas.

The operation of the first embodiment will be explained next.

FIG. 3 is a block diagram illustrating the operation of the controlling apparatus 10 of the diesel engine.

Generally, the combustion chamber 2 of the diesel engine E is supplied outside air through the intake pipe 20, and the required amount of exhaust gas is returned to intake system through the recirculating pipe 30. Required compression pressure is obtained by the provided outside air and recirculated exhaust gas, and so fuel burns without being heated undesired high temperature; therefore, the generation of nitrogen oxide is inhibited in the smallest level.

Namely, recirculated gas temperature in the recirculating pipe 30, outside air temperature, the state of the engine indicated by engine coolant temperature, exhaust gas temperature, rev count and if possible compression pressure, ignition temperature etc. and the fuel flow rate are being detected, and that the required amount of air for the fuel flow rate is calculated by these detected data, and then the required recirculated gas flow rate is calculated on the basis of information of the required amount of air.

Referring to FIG. 3, in STEP 1, the air calculating section 40 calculates the required amount of air on the basis of information of the amount of the fuel detected by said fuel sensor 11, namely an injection amount of fuel injection pump, and the outside air temperature detected by said outside air temperature sensor 21.

Since, in almost all the case, only this required amount of air is in short for supplying it to the diesel engine E as the amount of gas, exhausted recirculated gas is returned to the intake pipe 20 through the recirculating pipe 30. Thus in STEP 2, the recirculated gas calculating section 50 calculates the required recirculated gas flow rate on the basis of information from said recirculated gas temperature sensor 31 and said engine state sensor 15. The required recirculated gas flow rate becomes seldom zero according to the situation.

Then, in STEP 3, on the basis of these calculated data, the outside air introducing control section 45 operates said outside air throttle valve 22 responding to the calculated required amount of air and sets an appropriate intake of outside air. At that time, the recirculating gas control section 55 operates said recirculated gas throttle valve 32 responding to the calculated amount of recirculated gas and sets an appropriate amount of recirculated gas.

In STEP 5, an intake of outside air is measured by the outside air flow meter 25, and the measured data are fed back to the outside air introducing control section 45 to confirm operating accuracy. Similarly in STEP 6, a return gas flow rate is measured by the recirculated gas flow mater 35, and the measured data are fed back to the recirculating gas control section 55 to confirm operating accuracy. The cooling means 36 cools recirculated gas to inhibit abnormal burning at undesired high temperature caused by recirculated gas being introduced in the combustion chamber 2, and to prevent the recirculated gas temperature sensor 31, the recirculated gas throttle valve 32 and the recirculated gas flow meter 35 from being heated at high temperature. The particle removing means 37 prevents the engine and said sensors from being damaged and affected by various particles included in recirculated gas.

The appropriate amount of oxygen for fuel burning at given compression pressure is supplied by said amount of intake of outside air and the amount of recirculated gas.

Thus, recirculated gas temperature in the recirculating pipe 30 is detected by the recirculated gas temperature sensor 31, and outside air temperature is detected by the outside air temperature sensor 21 mounted to the intake pipe 20. The engine state is sensed by the engine state sensor 15 that detects the engine coolant temperature, the exhaust gas temperature, an exhausting state, the rev count, furthermore compression pressure, ignition temperature etc. at need, and the fuel flow rate is detected by the fuel sensor 11; and so, the appropriate amount of oxygen for fuel burning is always supplied by supplying outside air responded to said required amount of air and required amount of recirculated gas. Therefore combustion velocity and combustion temperature are inhibited by controlling inert recirculated gas, and so, the generation of nitrogen oxide is inhibited in the smallest level.

Figure 4:
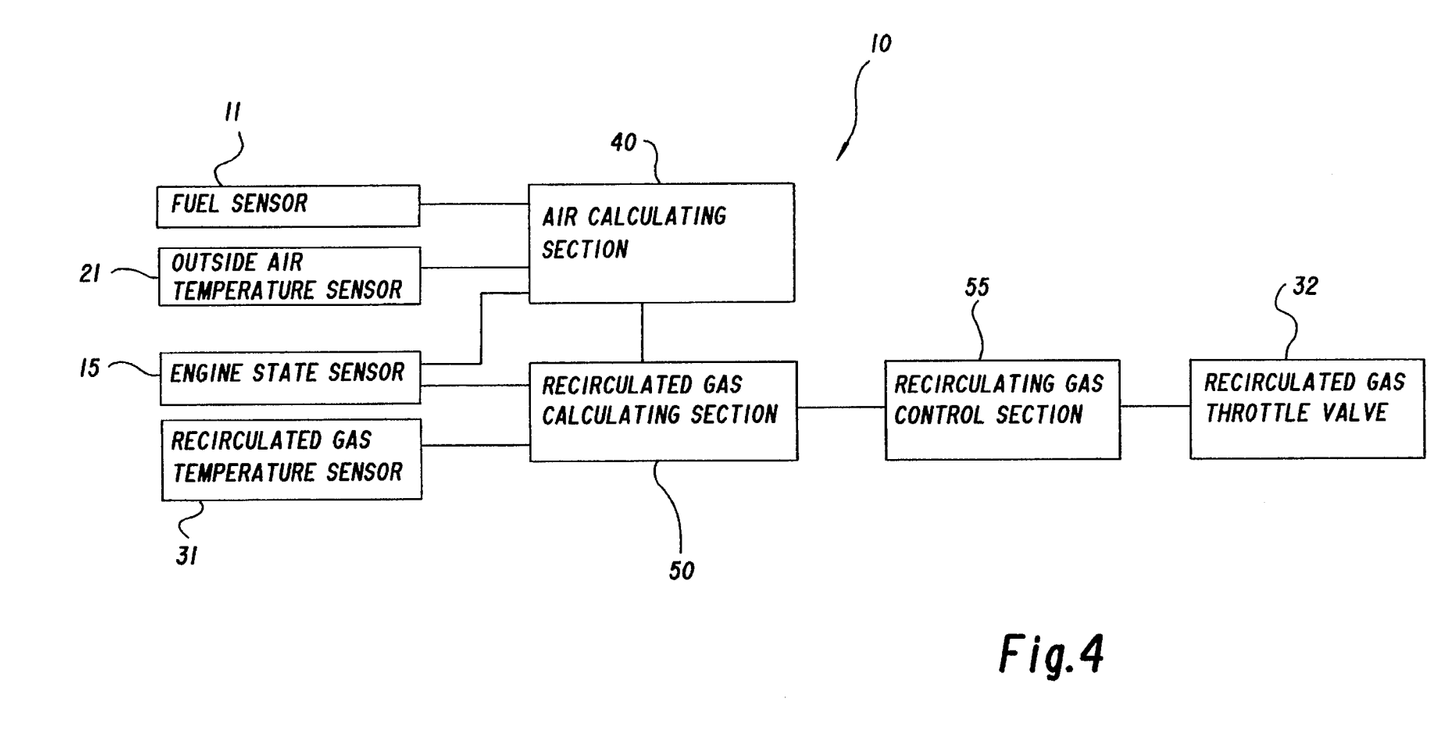
FIG. 4 is a block diagram showing second embodiment of an apparatus of controlling a diesel engine.
Figure 5:
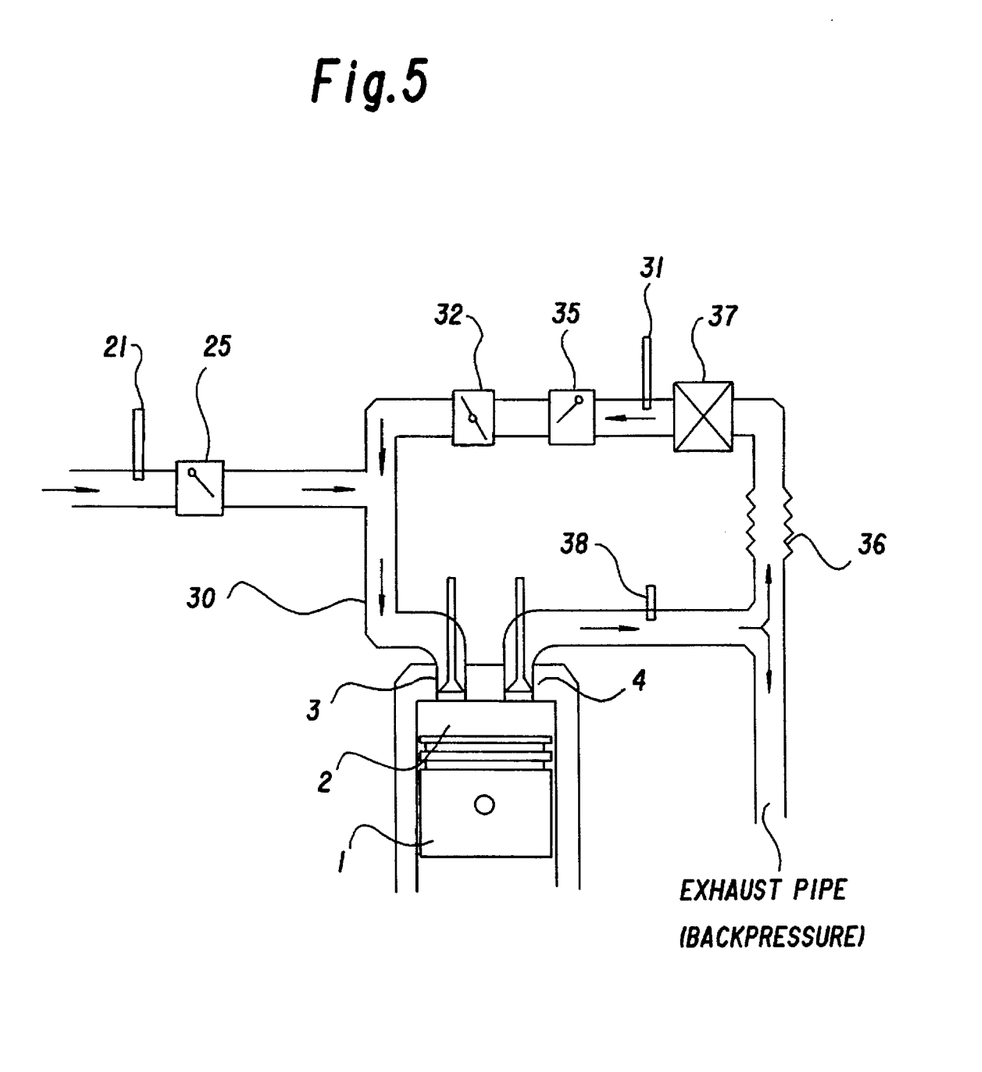
FIG. 5 is a schematic illustration showing the composition of first embodiment of an apparatus of controlling a diesel, engine near the engine.

In FIGS. 4 and 5, there is shown second embodiment of this invention.

Since there is corresponding relationship between the intake of outside air and the amount of recirculated gas, the detrimental compositions of exhaust gas can be decreased only by controlling recirculated gas without controlling of the outside air throttle valve 22 and the intake of outside air.

This embodiment differs from the first embodiment in having no outside air introducing control section 45 and outside air throttle valve 22. As other parts are similar to those of the first embodiment, the same components in FIG. 4 and FIG. 5 are numbered the same numerals, and their explanations will be omitted.

In the second embodiment, the air calculating section 40 calculates required amount of air on the basis of the amount of the fuel detected by said fuel sensor 11 and the outside air temperature detected by said outside air temperature sensor 21, and then the recirculated gas calculating section 50 receives information of said calculated required amount of air and calculates the required amount of recirculated gas on the basis of information from said recirculated gas temperature sensor 31 and said engine state sensor 15 with considering outside air. And the recirculating gas control section 55 operates said recirculated gas throttle valve 32 responding to the calculated amount of recirculated gas.

In FIGS. 6–10, there is shown third embodiment of this invention.

In this embodiment, the appropriate amount of air and the recirculated gas are not calculated, but formed a table before the operation. The components similar to those of the first embodiment are numbered the same numerals, and their explanations will be omitted.

Figure 6:
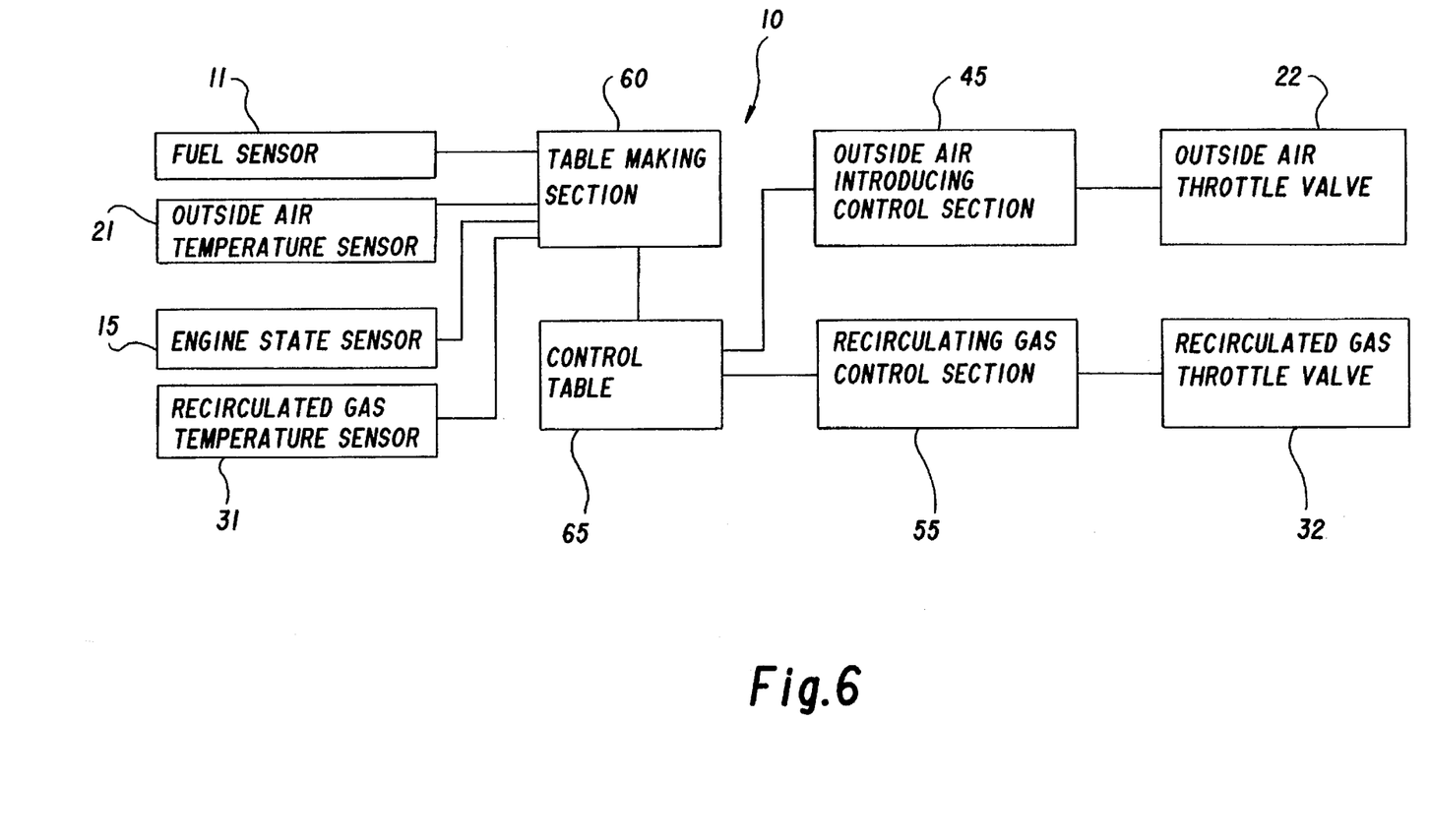
FIG. 6 is a schematic illustration showing the composition of third embodiment of an apparatus of controlling a diesel engine near the engine.
Figure 7:
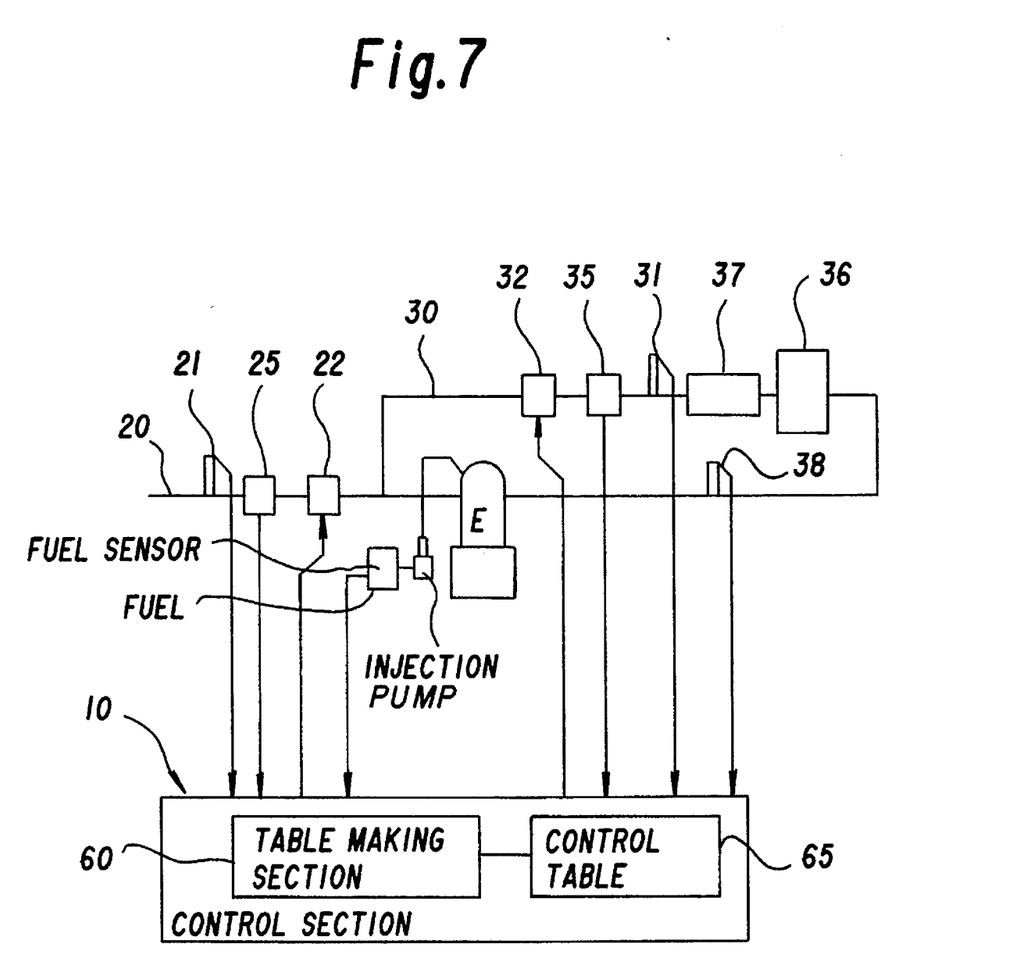
FIG. 7 is a schematic illustration showing the composition of first embodiment of an apparatus of controlling a diesel engine near the engine.

As shown in FIG. 6 and 7, the table making section 60 detects previously state data for obtaining the required amount of air and the required recirculated gas flow rate responded to various states indicated by information from respective sensors. The state data are stored in the control table 65 for controlling the diesel engine E.

In the case of controlling outside air or the recirculated gas directly, as shown in FIG. 6, the outside air introducing control section 45 and the recirculating gas control section 55 read the appropriate amount of air or recirculated gas in the control table 65 to operate the outside air throttle valve 22 for setting the appropriate intake of outside air and to operate the recirculated gas throttle valve 32 for setting appropriate amount of recirculated gas.

Although the control table 65 can be formed previously in a factory corresponding to driving state of the engine, it can be formed in the practical engine driving.

The table making section 60 detects exhaust gas condition of the engine corresponding to the changes of the various conditions indicated by respective sensors for learning and educating exhaust gas condition, and the control table 65 stores good condition data of exhaust gas corresponding to the various conditions.

Figure 8:
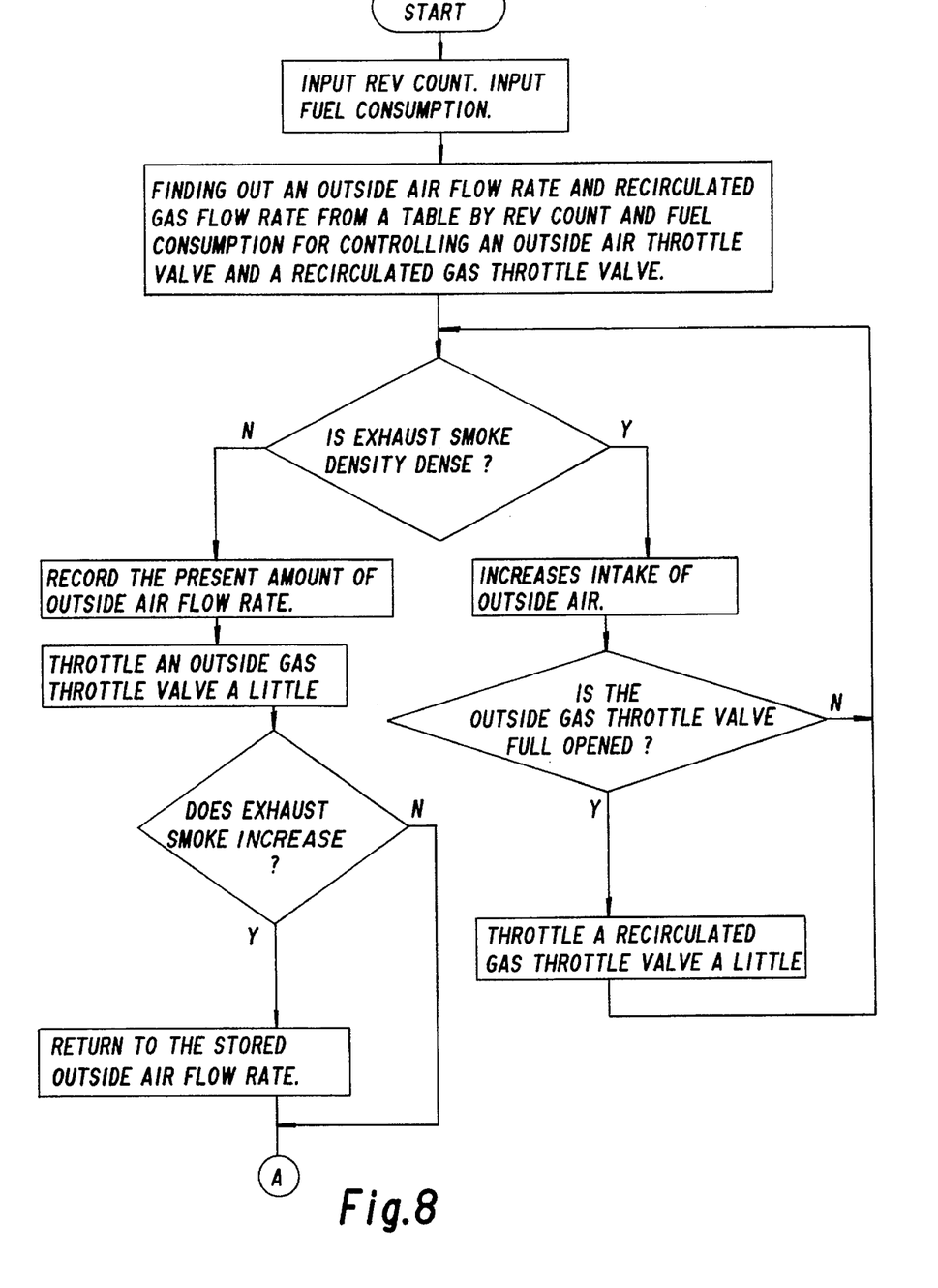
FIG. 8 is a block diagram showing operation of third embodiment of an apparatus of controlling a diesel engine.
Figure 9:
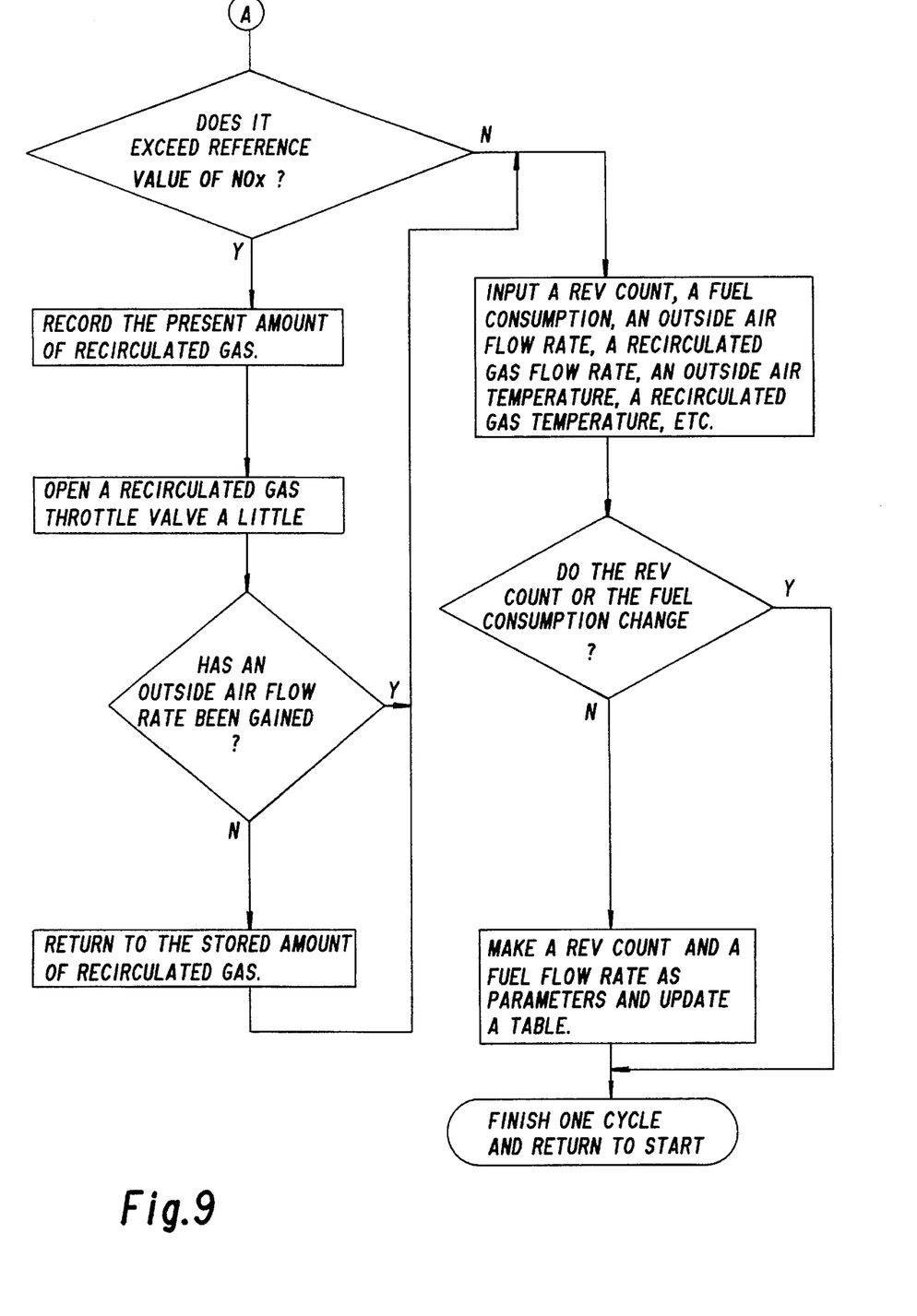
FIG. 9 is a block diagram showing operation of third embodiment of an apparatus of controlling a diesel engine.

FIG. 8 and 9 are flow diagrams illustrating process of forming the control table 65 by the table making section 60. Although rough data are stored in the control table 65, they can be updated to improve the exhaust gas. Processes generally comprises a step for detecting improved states of exhaust gas by operating the outside air throttle valve 22 and a step for similarly detecting improved states of exhaust gas by operating the recirculated gas throttle valve 32 to find out control data corresponding to preferable exhaust gas states.

Figure 10:
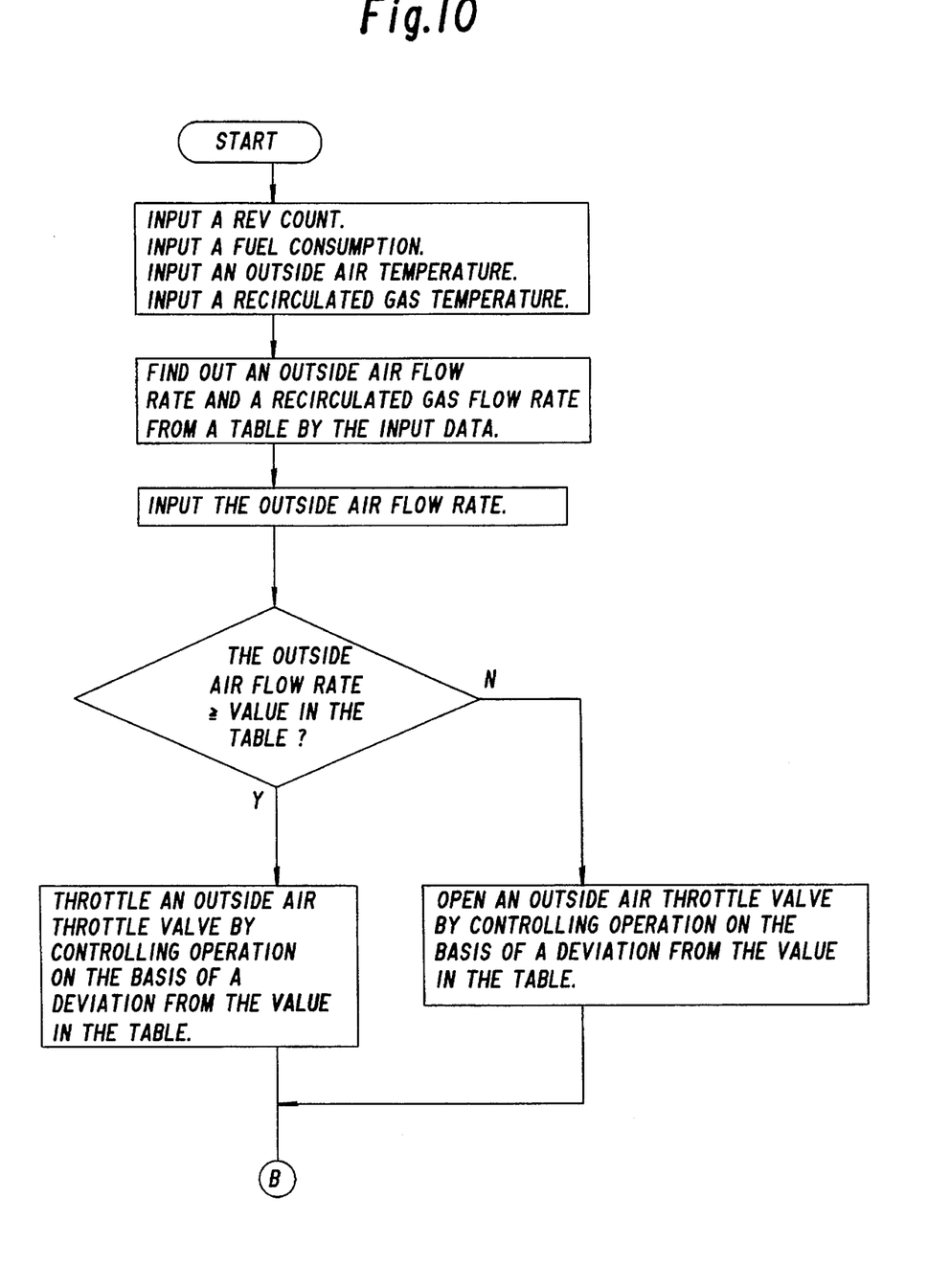
FIG. 10 is a block diagram showing operation of third embodiment of an apparatus of controlling a diesel engine.
Figure 11:
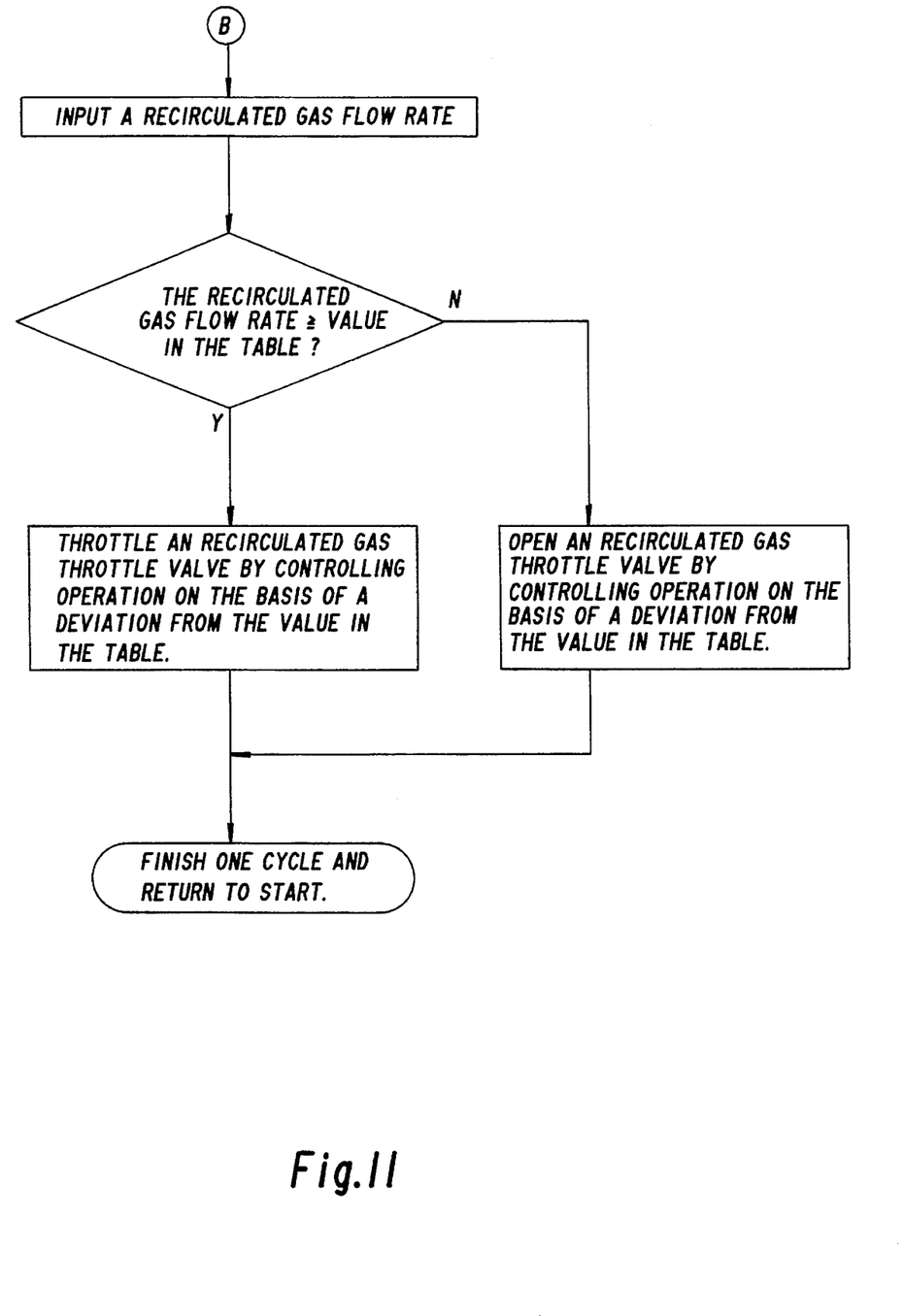
FIG. 11 is a block diagram showing operation of third embodiment of an apparatus of controlling a diesel engine.

FIG. 10 and 11 are flow diagrams illustrating an operation of controlling apparatus 10. Proper data are already being stored in the control table 65, and the controlling apparatus 10 operates the outside air throttle valve 22 and the recirculated gas throttle valve 32 according to the proper data for the operation in proper exhaust gas states.

Figure 12:
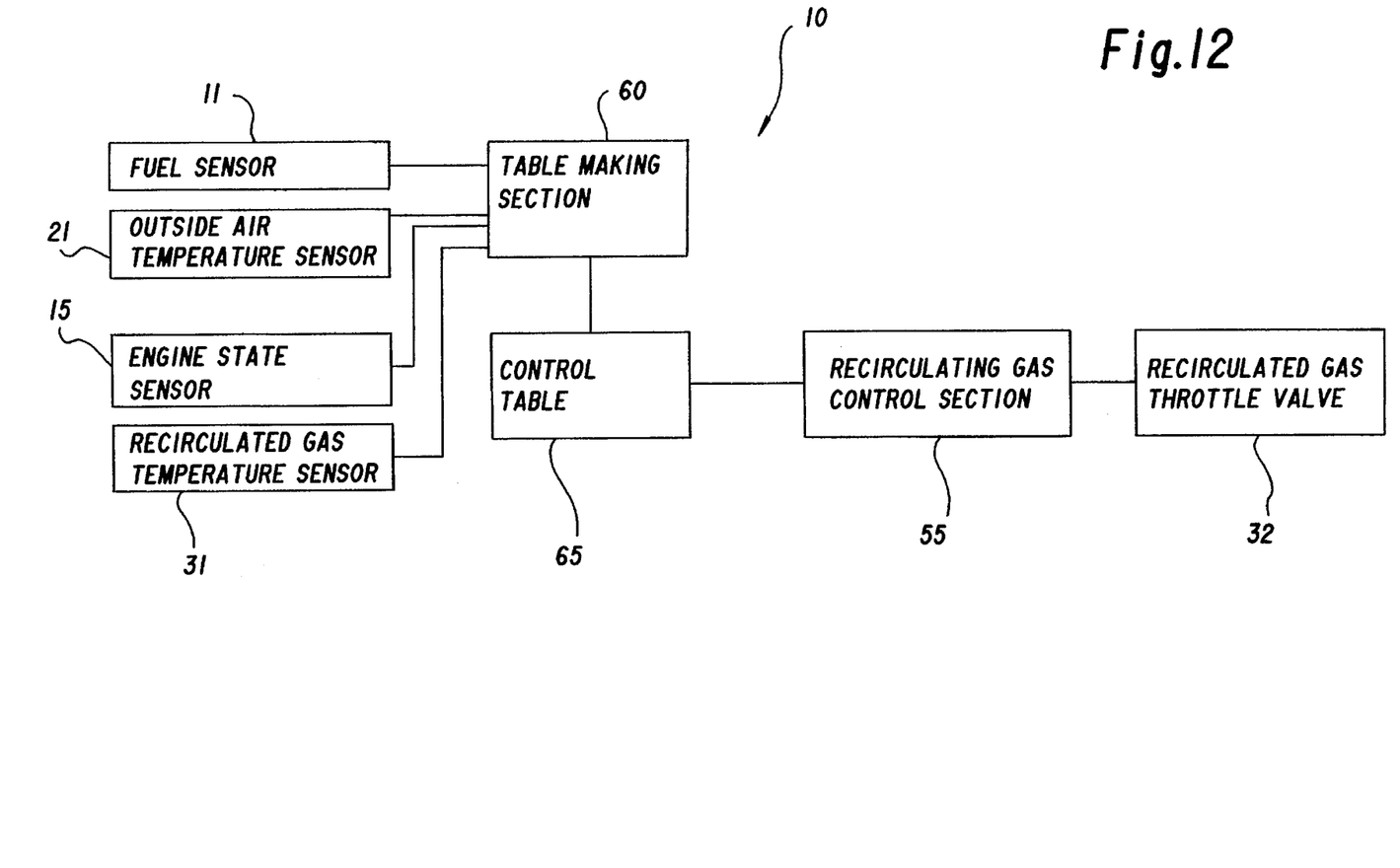
FIG. 12 is a schematic illustration showing the composition of fourth embodiment of an apparatus of controlling a diesel engine near the engine.

In FIG. 12, there is shown fourth embodiment of this invention.

This embodiment decreases the detrimental compositions of exhaust gas only by controlling recirculated gas with the the control table 65. In FIG. 12, the components similar to those of the third embodiment are numbered the same numerals, and their explanations will be omitted.

Previously the table making section 60 detects state data for obtaining the required amount of air and the required recirculated gas flow rate responded to various states indicated by information from respective sensors, and these data are stored in the control table 65 for controlling the diesel engine E. In the control table 65, data only for the recirculated gas throttle valve 32 are stored, and so only the recirculated gas throttle valve 32 is controlled.

Since the sensors and coefficients of calculating section, etc. become different according to the engine characteristics such as the shape of the combustion chamber or fuel injection state in the chamber or allowable value, they are experimentally set. Of course a table which calculates required values may be formed for setting to transient phenomena or various modes. Although this table may be formed as data that can control the engine in optimum in developing stage of the engine, it may be formed by learning and educating corresponding to the operating state. It is convenient to use a microcomputer in the control sections.

If the relationship between the flow rate of gas and the throttle valve opening is formed in a table, the time for obtaining the required flow rate can be shortened.

If a load on the engine becomes heavy and so the rate of supplied fuel becomes large, the amount of air becomes large corresponding to the rate of supplied fuel while the recirculated gas rate becomes small; therefore, as combustion state of the engine becomes similar to that of usual diesel engines, it never becomes low power. On the other hand, if a load on the engine becomes light and so the rate of supplied fuel becomes small, the rate of recirculated gas becomes large; therefore the detrimental compositions of exhaust gas is decreased by supplying the appropriate amount of oxygen for good fuel burning.

When an exhaust brake is operated, an accelerator pedal has been returned completely; therefore, its usual performance can be exerted by opening the outside air throttle valve fully and closing the recirculated gas throttle valve completely.

A supercharger such as a turbo-charger may be mounted on the location after the outside gas and the recirculated gas are mixed.

INDUSTRIAL APPLICABILITY

According to the the method and apparatus for controlling a diesel engine, the appropriate amount of oxygen for fuel burning is supplied by supplying outside air responded to said required amount of air and required amount of recirculated gas, so oxygen is never supplied excessively, thereby fuel burns properly in the combustion chamber. Thus the generation of nitrogen oxide is inhibited and the detrimental compositions of exhaust gas are decreased.

I claim:

1. A controlling apparatus of a diesel engine for decreasing the detrimental compositions of exhaust gas by supplying an appropriate amount of oxygen for fuel burning comprising:

a recirculating pipe, having a recirculated gas temperature sensor and a recirculated gas throttle valve, for recirculating exhaust gas between exhaust system and intake system;

an intake pipe having an outside air temperature sensor and an outside air throttle valve;

a fuel sensor;

an engine state sensor;

an air calculating section for calculating a required amount of air on the basis of an amount of fuel detected by said fuel sensor and the outside air temperature detected by said outside air temperature sensor, an outside air introduction control section for operating said outside air throttle valve responding to the calculated required amount of air;

a recirculated gas calculating section for receiving information of the calculated required amount of air and for calculating a required recirculated gas flow rate on the basis of information from said recirculated gas temperature sensor and said engine state sensor; and a recirculating gas control section for operating said recirculated gas throttle valve responding to the calculated amount of recirculated gas.

2. A controlling apparatus of a diesel engine for decreasing the detrimental compositions of exhaust gas by supplying an appropriate amount of oxygen for fuel burning comprising:

a recirculating pipe, for recirculating exhaust gas between exhaust system and intake side, having a recirculated gas temperature sensor and a recirculated gas throttle valve;

an intake manifold having an outside air temperature sensor;

a fuel sensor;

an engine state sensor;

an air calculating section for calculating a required amount of air on the basis of an amount of the fuel detected by said fuel sensor and the outside air temperature detected by said outside air temperature sensor;

a recirculated gas calculating section for receiving information of the calculated required amount of air and calculating a required amount of recirculated gas on the basis of information from said recirculated gas temperature sensor and said engine state sensor; and a recirculating gas control section for operating said recirculated gas throttle valve responding to the calculated amount of recirculated gas.

3. A method of controlling a diesel engine, having a recirculating pipe for recirculating exhaust gas between exhaust system and intake side, to supply appropriate amount of oxygen for fuel burning, comprising the steps of:

detecting always recirculated gas temperature in said recirculating pipe, outside air temperature, an engine state and a fuel flow rate;

calculating a required amount of air on the basis of said fuel flow rate and calculating a required recirculated gas flow rate with receiving said required amount of air; and supplying outside air responded to said required amount of air and required amount of recirculated gas.

4. A method of controlling a diesel engine having a recirculating pipe for recirculating exhaust gas between exhaust system and intake system so as to decrease the detrimental compositions of exhaust gas by supplying appropriate amount of oxygen for fuel burning, comprising the steps of:

detecting always recirculated gas temperature in said recirculating pipe, outside air temperature, an engine state and a fuel flow rate;

calculating a required amount of air on the basis of said fuel flow rate and said outside air temperature, and calculating a required recirculated gas flow rate responding to said recirculated gas temperature and engine state with receiving said required amount of air; and controlling an outside air flow rate responding to said calculated required amount of air and a recirculated gas flow rate responding to calculated amount of recirculated gas.

5. A method of controlling a diesel engine, having a recirculating pipe for recirculating exhaust gas between exhaust system and intake system, to supply appropriate amount of oxygen for fuel burning, comprising the steps of:

detecting always recirculated gas temperature in said recirculating pipe, outside air temperature, an engine state and a fuel flow rate;

detecting an intake of outside air and calculating the fuel flow rate responded to said intake of outside air, and calculating a required recirculated gas flow rate with receiving said intake of outside air; and supplying outside air responded to said required amount of air and required amount of recirculated gas.

6. A controlling apparatus of a diesel engine comprising a control table for storing state data of exhaust gas being in a good condition from various sensors, said control table is connected to an outside air introducing control section and/or a recirculating gas control section, and their or its output is connected to an outside air throttle valve and/or recirculated gas throttle valve.

7. A method of controlling a diesel engine for supplying appropriate amount of oxygen for fuel burning, comprising the steps of:

storing state data of exhaust gas being in a good condition in a control table; and operating an outside air throttle valve and recirculated gas throttle valve or only the recirculated gas throttle valve responding the state data in a control table corresponding to various conditions.

8. A controlling apparatus of a diesel engine as claimed in claim 6, further comprising a table making section for learning and educating exhaust gas conditions by changing various conditions indicated by respective sensors, said control table stores good conditions of exhaust gas learned or educated by the table making section.

9. A method of controlling a diesel engine as claimed in claim 7, further comprising the steps of:

learning and educating exhaust gas conditions by changing various conditions indicated by respective sensors; and storing consequences of learning and education.

10. A controlling apparatus of a diesel engine as claimed in claim 1 or 2, said recirculating pipe is equipped with a cooling means or a radiator for preventing the temperature of said recirculated gas from rising.

11. A controlling apparatus of a diesel engine as claimed in claim 1 or 2, said recirculating pipe is equipped with a particle removing means for removing various particles included in recirculated gas.

* * * * *